United States Patent
Lu et al.

(10) Patent No.: US 9,367,675 B2
(45) Date of Patent: Jun. 14, 2016

(54) METHOD FOR VERIFYING AND CALIBRATING TIME

(71) Applicants: Zhou Lu, Beijing (CN); Huazhang Yu, Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/239,847

(22) PCT Filed: Jul. 31, 2013

(86) PCT No.: PCT/CN2013/080514
§ 371 (c)(1),
(2) Date: Feb. 20, 2014

(87) PCT Pub. No.: WO2014/032495
PCT Pub. Date: Mar. 6, 2014

(65) Prior Publication Data
US 2015/0161367 A1    Jun. 11, 2015

(30) Foreign Application Priority Data
Aug. 31, 2012 (CN) .......................... 2012 1 0320044

(51) Int. Cl.
*G06F 7/04* (2006.01)
*G06F 12/00* (2006.01)
(Continued)

(52) U.S. Cl.
CPC ............... *G06F 21/31* (2013.01); *G06F 21/44* (2013.01); *G06F 21/45* (2013.01); *H04L 9/3228* (2013.01); *G06F 2221/2129* (2013.01)

(58) Field of Classification Search
CPC . H04L 9/3228; H04L 63/0838; H04L 9/0863; H04L 9/3297; H04L 2463/082; G04G 5/00; G06F 1/14; G06F 1/12; G06F 21/31; G06F 21/45; G06F 21/44; G06F 2221/2129
See application file for complete search history.

(56) References Cited

U.S. PATENT DOCUMENTS

2010/0082966 A1*   4/2010   Lu et al. ..................... 713/2
2013/0124292 A1*   5/2013   Juthani ................. 705/14.26

FOREIGN PATENT DOCUMENTS

CN   101800643 A   8/2010
CN   101895527 A   11/2010

(Continued)

OTHER PUBLICATIONS

M' Raihi et al., TOTP: Time-Based One-Time Password Algorithm, May 2011, Internet Engineering Task Force (IETF), ISSN: 2070-1721.*

(Continued)

*Primary Examiner* — Michael S McNally
*Assistant Examiner* — Amie C Lin
(74) *Attorney, Agent, or Firm* — Ohlandt, Greeley, Ruggiero & Perle, LLP

(57) ABSTRACT

A method for verifying and calibrating time is provided. The method includes: receiving a password and related information sent by a client, obtaining related information and generating a dynamic password and comparing the related information with the dynamic password, determining whether a preset condition according to the prestored preset time is satisfied, computing offset rate according to a benchmark time offset value if the preset condition according to the prestored preset time is satisfied and determining whether a calibrating condition is satisfied, calibrating time offset value if the calibrating condition is satisfied, and returning successful verification information, returning successful verification information directly if calibrating condition is not satisfied.

22 Claims, 3 Drawing Sheets

(51) Int. Cl.
*G06F 12/14* (2006.01)
*G06F 13/00* (2006.01)
*G06F 17/30* (2006.01)
*G11C 7/00* (2006.01)
*G06F 21/31* (2013.01)
*H04L 9/32* (2006.01)
*G06F 21/44* (2013.01)
*G06F 21/45* (2013.01)

(56) References Cited

FOREIGN PATENT DOCUMENTS

CN 102307092 A 1/2012
CN 102868529 A 1/2013

OTHER PUBLICATIONS

International Search Report dated Aug. 31, 2012 corresponding to PCT/CN2013/080514, 3 pp.

* cited by examiner

METHOD FOR VERIFYING AND CALIBRATING TIME

CROSS REFERENCE TO RELATED APPLICATION

The present application claims the priority to Chinese Patent Application No. 201210320044.3, filed with the Chinese Patent Office on Aug. 31, 2012, entitled as "METHOD FOR VERIFYING AND CALIBRATING TIME", the entire contents of which are is incorporated herein by reference in its entirety.

BACKGROUND

1. Field of the Technology

The disclosure relates to information security field, more particularly to a method for verifying and calibrating time.

2. Background of the Technology

In Time type One-time Password (OTP), time is used as a dynamic factor. Precision of time is an important index.

For a clock crystal with 32.768 KHz internal frequency of an OTP, a time offset is normally required to be no more than 2 minutes each year. However, because there are many factors leading to the time offset of time type OTP, for example, inaccuracy of a token clock, input delay of a user, delay in a network transferring process and malicious calibration of a user, etc.

In the prior art, a method for calibrating time according to an offset of system time and internal clock time is applied generally. However, the method can not be used to avoid malicious time calibration, which may cause failed verification easily. From what is described above, a time offset which may be caused by many factors in the time calibrating method in the prior art may lead failed verification. Especially, malicious calibration of time increases possibility of security risk.

SUMMARY

The disclosure provides a method for verifying and calibrating time in order to prevent a hardware token from being maliciously calibrated, which reduces possibility of failed verification and improves security of verification.

In order to achieve the above purpose, embodiments of disclosure apply a technical solution as the following:

A method for verifying and calibrating time, including:

a step 11 of receiving, by a calibrating device, a first dynamic password and a user identifier sent from a client, computing a current time factor according to current time of a server and determining a first time factor;

a step 12 of obtaining, by the calibrating device, a seed according to the user identifier, generating a second dynamic password group and comparing a second dynamic password in the second dynamic password group with the first dynamic password, going to step 14 if the second dynamic password matches with the first dynamic password, going to step 13 if the second dynamic password does not match with the first dynamic password;

the step 13 of determining, by the calibrating device, a second time factor according to the current time factor and a first preset value, generating a third dynamic password group and comparing a third dynamic password in the third dynamic password group with the first dynamic password, going to step 14 if the third dynamic password matches with the first dynamic password; returning error information and going back to step 11 if the third dynamic password does not match with the first dynamic password;

the step 14 of recording, by the calibrating device, current successful verification time and a current time offset value, obtaining last calibrating time, obtaining a first time difference according to current successful verification time and the last calibrating time and determining whether the first time difference is no less than a second preset value, going to step 15 if the first time difference is no less than a second preset value; returning successful verification information if the first time difference is less than a second preset value;

the step 15 of obtaining, by the calibrating device, a benchmark offset value and corresponding time of the benchmark offset value, determining whether the current time offset value belongs to an offset interval determined by the benchmark time offset value, going to a step 16 if the current time offset value belongs to the offset interval determined by the benchmark time offset value; updating, by the calibrating device, the benchmark time offset value and returning successful verification information if the current time offset value does not belong to the offset interval determined by the benchmark time offset value;

the step 16 of computing, by the calibrating device, a benchmark offset according to the benchmark time offset value and corresponding time of the benchmark time offset value, obtaining a time offset value of last successful verification and corresponding time of the last successful verification, computing a unit offset according to the time offset of last successful verification and corresponding time of the same and a current time offset and corresponding time of the same, determining whether the unit offset belongs to the interval determined by the benchmark offset, going to step 17 if the unit offset belongs to the interval determined by the benchmark offset; returning successful verification information if the unit offset does not belong to the interval determined by the benchmark offset;

a the step 17 of updating, by the calibrating device, a clock offset according to the current time offset value, storing calibrating time of this time to a first storing place, storing current time offset value and the current successful verification time to a third storing place to replace an original content and returning successful verification information.

Computing the current time factor according to the current time of the server and determining the first time factor includes:

subtracting a preset starting time from the current time of the server to obtain a difference, adding the difference to the clock offset to obtain a sum, dividing the sum by a clock period to obtain the current time factor, wherein the first time factor includes a current time factor and a time factor of a previous one clock period and a time factor of a next one clock period.

Generating the second dynamic password group includes:

generating, by the calibrating device, the second dynamic password group according to the seed and the first time factor.

Comparing the second dynamic password in the second dynamic password group with the first dynamic password includes:

a step S101 of obtaining, by the calibrating device, a time factor of the first time factor and taking the time factor as a current first time factor, generating the second dynamic password in the second dynamic password group according to the current first time factor and the seed;

a step S102 of determining, by the calibrating device, whether current second dynamic password is identical to the first dynamic password, the current second dynamic password being determined to match with the first dynamic password successfully if the current second dynamic password is identical to the first dynamic password; going back to step S101 and obtain a next first time factor if current second dynamic password is not identical to the first dynamic password;

or a step S201 of obtaining, by the calibrating device, all time factors of the first time factor and generating the second dynamic password group according to the first time factor and the seed;

a step S202 of obtaining, by the calibrating device, the second dynamic password from the second dynamic password group and comparing the second dynamic password with the first dynamic password, the second dynamic password being determined to match with the first dynamic password successfully if the second dynamic password is identical to the first dynamic password; performing step S202 to obtain a next second dynamic password from the second dynamic password group if the current second dynamic password is not identical to the first dynamic password.

The second time factor includes all time factors inside a synchronous window and outside a verification window.

Generating the third dynamic password group includes:

generating, by the calibrating device, the third dynamic password group according to the seed and the second time factor.

Comparing the third dynamic password in the third dynamic password group with the first dynamic password includes:

a step S301 of obtaining, by the calibrating device, a time factor of the second time factor and taking the time factor as a current second time factor and generating the third dynamic password in the third dynamic password group according to the current second time factor and the seed;

a step S302 of determining, by the calibrating device, whether current third dynamic password is identical to the first dynamic password, the third dynamic password being determined to match with the first dynamic password successfully if the current third dynamic password is identical to the first dynamic password; going back to step S301 to obtain a next second time factor if the current third dynamic password is not identical to the first dynamic password;

or a step S401 of obtaining, by the calibrating device, all second time factors and generating the third dynamic password group according to the second time factor and the seed;

a step S402 of obtaining, by the calibrating device, the third dynamic password in the third dynamic password group and comparing the third dynamic password with the first dynamic password, the third dynamic password being determined to match with the first dynamic password successfully if the current third dynamic password is identical to the first dynamic password; performing step S402 to obtain a next third dynamic password from the third dynamic password group if the current third dynamic password is not identical to the first dynamic password.

The second preset value is a preset calibrating period, which represents a minimum time value required by calibrating time once.

The benchmark time offset value and corresponding time of the benchmark time offset value include:

a first benchmark time offset value is a negative maximum offset value and corresponding time of the first benchmark time offset value is a first time; a second benchmark time offset value is a negative minimum offset value and corresponding time of the second benchmark time offset value is a second time; a third benchmark time offset value is a positive minimum offset value and corresponding time of the third benchmark time offset value is a third time; a fourth benchmark time offset value is a positive maximum offset value and corresponding time of the fourth benchmark time offset value is a fourth time.

Determining whether the current time offset value belongs to the offset interval determined by the benchmark offset value includes:

determining, by the calibrating device, whether the current time offset value is no less than the first benchmark time offset value and no more than the second benchmark time offset value or the current time offset value is no less than the third benchmark time offset value and no more than the fourth benchmark offset value.

Updating, by the calibrating device, the benchmark time offset value includes:

a step S501 of comparing, by the calibrating device, the current time offset value with the benchmark time offset value;

going to step S502 in the case where the current time offset value is less than the first benchmark offset value;

the step S502 of replacing the current time offset value with the first benchmark time offset value;

going to step S503 in the case where the current time offset value is more than the second benchmark time and less than 0;

the step S503 of replacing the current time offset value with the second benchmark time offset value;

going to step S504 in the case where the current time offset value is more than 0 and less than the third benchmark time offset value;

the step S504 of replacing the current time offset value with the third benchmark time offset value;

going to Step S505 in the case where the current time offset value is more than the fourth benchmark time offset value;

the step S505 of replacing the fourth benchmark time offset value with the current time offset value.

Computing the benchmark offset according to the benchmark time offset value and corresponding time of the benchmark time offset value includes:

obtaining, by the calibrating device, a first benchmark offset by dividing a difference between the first benchmark time offset value and the fourth benchmark time offset value by a difference between the first time and the fourth time; obtaining, by the calibrating device, a second benchmark offset by dividing a difference between the second benchmark time offset value and the third benchmark time offset value by a difference between the second time and the third time.

Computing the unit offset value according to the time offset of last successful verification and corresponding time of the last successful verification and the current time offset value and corresponding time of the current time offset value includes:

subtracting, by the calibrating device, the time offset value of last successful verification from the current time offset value to obtain a first difference, subtracting the time of last successful verification from current successful verification time to obtain a second difference, dividing the first difference by the second difference to obtain the unit offset.

Determining whether the unit offset belongs to the interval determined by the benchmark offset includes:

comparing, by the calibrating device, the first benchmark offset with the second benchmark offset;

determining whether the unit offset is no more than the first benchmark offset and is no less than the second benchmark offset if the first benchmark offset is more than the second benchmark offset, performing step 17 if the unit offset is no more than the first benchmark offset and is no less than the second benchmark offset; ending the present operation if the unit offset is more than the first benchmark offset or is less than the second benchmark offset;

determining whether the unit offset is no more than the second benchmark offset and is no less than the first benchmark offset if the first benchmark offset is less than the second benchmark offset, performing step 17 if the unit offset is no more than the second benchmark offset and is no less than the first benchmark offset; ending the present operation if the unit offset is more than the second benchmark offset or is less than the first benchmark offset.

A method for verifying and calibrating time, including:

a step 21 of receiving, by a calibrating device, a first dynamic password and a user identifier sent from a client, computing a current time factor according to current time of a server and determining a first time factor;

a step 22 of obtaining, by the calibrating device, a seed corresponding to the user identifier, generating a second dynamic password group, and comparing a second dynamic password in the second dynamic password group with the first dynamic password, performing step 24 if the second dynamic password matches with the first dynamic password; performing step 23 if the second dynamic password does not match with the first dynamic password;

the step 23 of determining, by the calibrating device, a second time factor according to the current time factor and a first preset value, generating a third dynamic password group and comparing a third dynamic password in the third dynamic password group with the first dynamic password, performing step 24 if the third dynamic password matches with the first dynamic password; going back to step 21 if the third dynamic password does not match with the first dynamic password;

the step 24 of recording, by the calibrating device, current successful verification time and a current time offset value, obtaining last calibrating time, obtaining a first time difference according to the current successful verification time and last calibrating time, determining whether the first time difference is no less than a second preset value, performing step 25 if the first time difference is no less than the second preset value; returning successful verification information if the first time difference is less than the second preset value;

the step 25 of obtaining, by the calibrating device, a unit benchmark offset and an offset rate, computing a unit offset according to an offset value of last successful verification and corresponding time of the last successful verification and the current time offset value and corresponding time of the current time offset value;

a step 26 of determining whether the unit offset belongs to an interval determined by a benchmark offset and the offset rate, updating a clock offset according to a current time offset value if the unit offset belongs to the interval determined by the benchmark offset and the offset rate, storing current calibrating time to a first storing place to replace a content of the first storing place, storing the current time offset value and the current successful verification time to a third storing place to replace an original content of the third storing place, returning successful verification information; returning successful verification information if the unit offset does not belong to the interval determined by the benchmark offset and the offset rate.

Computing a current time factor according to the current time of a server and determining the first time factor includes:

subtracting a preset starting time from the current time of the server to obtain a difference, adding the difference to the clock offset to obtain a sum and dividing the sum by a clock period.

Generating the second dynamic password group includes:

generating, by the calibrating device, the second dynamic password group according to the seed and the first time factor.

Comparing the second dynamic password in the second dynamic password group with the first dynamic password includes:

a step S601 of obtaining, by the calibrating device, a time factor of the first time factor and taking the time factor as a current first time factor, generating the second dynamic password in the second dynamic password group according to the current first time factor and the seed;

a step S602 of determining, by the calibrating device, whether the current second dynamic password is identical to the first dynamic password; the second dynamic password being determined to match with the first dynamic password if the current second dynamic password is identical to the first dynamic password; going back to step S601 and obtaining a next first time factor if the current second dynamic password is not identical to the first dynamic password;

or a step S701 of obtaining, by the calibrating device, all time factors of the first time factor and generating the second dynamic password group according to the first time factor and the seed;

a step S702 of obtaining, by the calibrating device, the second dynamic password from the second dynamic password group and comparing the second dynamic password with the first dynamic password, the second dynamic password being determined to match with the first dynamic password successfully if the current second dynamic password is identical to the first dynamic password; performing step S702 to obtain a next second dynamic password from the second dynamic password group if the current second dynamic password is not identical to the first dynamic password.

The second time factor includes all time factors inside a synchronous window and outside a verification window.

The third dynamic password is generated by the calibrating device according to the seed and the second time factor.

Comparing the third dynamic password with the first dynamic password includes:

a step S801 of obtaining, by the calibrating device, a time factor of the second time factor, generating a third dynamic password according to the current second time factor and the seed;

a step S802 of determining, by the calibrating device, whether the third dynamic password is identical to the first dynamic password, the third dynamic password being determined to match with the first dynamic password successfully if the third dynamic password is identical to the first dynamic password; going back to step S802 and obtaining next second time factor if the third dynamic password is not identical to the first dynamic password;

or a step S901 of obtaining, by the calibrating device, all time factors of the second time factor and generating all third dynamic passwords according to the second time factors and the seed;

a step S902 of comparing, by the calibrating device, the third dynamic passwords with the first dynamic password respectively, the third dynamic password being determined to match with the first dynamic password successfully if one of the third dynamic passwords is identical to the first dynamic password; obtaining a next third dynamic password and performing step S902 if one of the third dynamic passwords is not identical to the first dynamic password.

The second preset value includes:

a preset calibrating period which represents a minimum time value required by calibrating time once.

Computing the unit offset according to the offset value of last successful verification and corresponding time of the last successful verification and the current time offset value and corresponding time of the current time offset value includes:

subtracting the time offset of last successful verification from the current time offset to obtain a third data, subtracting last verification time from the current verification time to obtain a fourth data and dividing the third data by the fourth data to obtain the unit offset.

A first interval determined by the benchmark offset and the benchmark offset rate includes:

subtracting, by the calibrating device, a product of the benchmark offset and the benchmark offset rate from the benchmark offset to obtain a first data, adding the benchmark offset to the product of the benchmark offset and the benchmark offset rate to obtain a second data and determining that data which is greater than or equal to the first data and less than or equal to the second data belongs to the first interval;

wherein determining whether the unit offset belongs to the interval determined by the benchmark offset and the benchmark offset rate includes:

determining whether the unit offset is no less than the first data and no more than the second data.

The advantages of the disclosure includes that the disclosure provides the method for verifying and calibrating time, which can effectively preventing a hardware token from being malicious calibrated so as to decrease possibility of failed verification and improves security of the verification.

BRIEF DESCRIPTION OF THE DRAWINGS

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those of ordinary skill in the art without any creative work belong to the scope of the disclosure.

DETAILED DESCRIPTION

The technical solutions of the embodiments of the disclosure are described clearly and completely in conjunction with the accompanying drawings as follows. Apparently, the described embodiments are merely a part of but not all of embodiments according to the disclosure. Based on the described embodiments of the disclosure, other embodiments obtained by those of ordinary skill in the art without any creative work belong to the scope of the disclosure.

In order to avoid malicious calibrating time and improve security of calibrating time, the disclosure provides a method for verifying and calibrating time. Further detailed illustration for the embodiments of the disclosure is provided in conjunction with the accompanying drawings.

Embodiment 1

Figure 1:
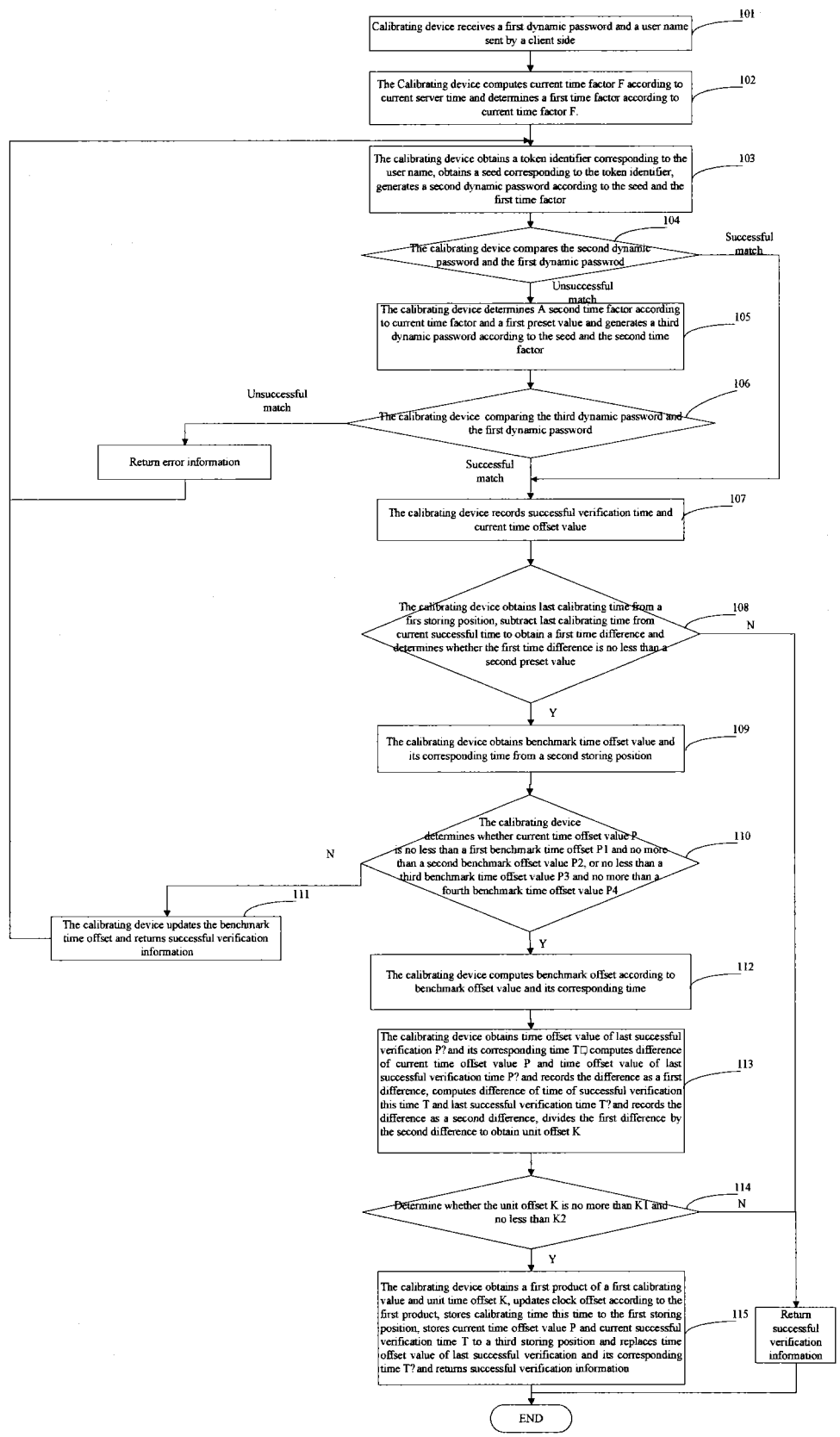
FIG. 1 is a flow chart of a method for verifying and calibrating time provided in Embodiment 1 of the disclosure.

Referring to FIG. 1, Embodiment 1 of the disclosure provides a method for verifying and calibrating time. The method includes steps 101-115.

Step 101 is receiving, by a calibrating device, a first dynamic password and a user name sent by a client.

Step 102 is computing, by the calibrating device, a current time factor F according to current time of a server and determining a first time factor according to the current time factor F.

In Embodiment 1, computing the current time factor F includes: subtracting a preset start time T0 from a current server time T to obtain a difference and then dividing the difference by a clock period. For example, the preset starting time T0 is (2012-7-1-00:00:00), the current server time T is (2012-7-5-14:00:15), the clock period is 60 seconds and the obtained current time factor F is 6605.

In Embodiment 1, the first time factor includes the current time factor, and a time factor of a previous clock period and a time factor of a next clock period. For example, if the current time factor F is 6605, the first time factor includes 6604, 6605 and 6606.

Preferably, in Embodiment 1, the clock period is 60 seconds.

Step 103 is obtaining, by the calibrating device, a token identifier corresponding to the user name and obtaining a corresponding seed according to the token identifier and generating a second dynamic password group in a verification window according to the seed and the first time factor.

In Embodiment 1, the token identifier may be a token sequence number and the seed may be prestored in a device.

Step 104 is comparing, the calibrating device, a second dynamic password in the second dynamic password group with the first dynamic password, going to Step 107 if the second dynamic password matches with the first dynamic password; going to Step 105 if the second dynamic password does not match with the first dynamic password.

The first time factor in Embodiment 1 may include (F−1), F and (F+1).

Comparing, by the calibrating device, the second dynamic password in the second dynamic password group with the first dynamic password may include: obtaining, by the calibrating device, a time factor in the first factor and generating a second dynamic password in the second dynamic password group according to current first time factor and the seed; determining by the calibrating device, whether current second dynamic password is equal to the first dynamic password; the second dynamic password being determined to match with the first dynamic password successfully if current second dynamic password is equal to the first dynamic password; going back to obtain a next time factor in the first time factor if current second dynamic password is not equal to the first dynamic password.

It should be noted that comparing the second dynamic password in the second dynamic password group with the first dynamic password may also include: obtaining, by the calibrating device, all time factors of the first time factor and generating a second dynamic password group according to the first time factor and the seed; obtaining, by the calibrating device, a second dynamic password in the second dynamic password group and comparing the second dynamic password with the first dynamic password; the second dynamic password matches with the first dynamic password if current second dynamic password is identical to the first dynamic password; going back to obtain a second dynamic password again if the second dynamic password is not identical to the first dynamic password.

Step 105 is determining, by the calibrating device, a second time factor according to current time factor and a first preset value and generating a third dynamic password group in a synchronous window according to the seed and the second time factor.

In Embodiment 1, the first preset value is size of the synchronous window; preferably, the first preset value in Embodiment 1 is 10.

The second time factor in Embodiment 1 is a time factor inside the synchronous window and outside a verification window, which includes (F−2), (F−3), (F−4), (F−5), (F−6), (F+2), (F+3), (F+4), (F+5) and (F+6).

Step 106 is comparing, by the calibrating device, a third dynamic password in the third dynamic password group with the first dynamic password; going to Step 107 if the third dynamic password matches with the first dynamic password; prompting error information and going to Step 101 if the third dynamic password does not match with the first dynamic password.

Comparing, by the calibrating device, the third dynamic password in the third dynamic password group with the first dynamic password may include: obtaining, by the calibrating device, a time factor in the second time factor, generating a third dynamic password in the third dynamic password group according to current second time factor and the seed; determining, by the calibrating device, whether current third dynamic password is identical to the first dynamic password, the current third dynamic password being determined to match with the first dynamic password if the current third dynamic password is identical to the first dynamic password; going back and obtaining a next time factor in the second time factor if the third dynamic password is not identical to the first dynamic password.

It should be noted that comparing the third dynamic password in the third dynamic password group with the first dynamic password further may also include: obtaining, by the calibrating device, all time factors of the second time factor and generating a third dynamic password group according to the second time factor and the seed; comparing, by the calibrating device, a third dynamic password in the third dynamic password group with the first dynamic password; the third dynamic password matches with the first dynamic password if the third dynamic password is identical to the first dynamic password; going back to obtain a third dynamic password again if the third dynamic password is not identical to the first dynamic password.

Step 107 is recording, by the calibrating device, time of successful verification and current time offset value.

In Embodiment 1, the current time offset value is a time deviation value generated by a token internal clock and a verification server when a time factor is verified successfully except for the current time factor; for example, when a second dynamic password corresponding to the first time factor (F−1) and the first dynamic password are verified successfully, the current time offset value is recorded as −1.

Step 108 is obtaining, by the calibrating device, time of last calibrating from a first storing place, subtracting the last calibrating time from the current successful verification time to obtain a first time difference and determining whether the first time difference is no less than a second preset value, going to Step 109 if the first time difference is no less than the second preset value; returning successful verification information and ending the present operation if the first time difference is no less than a second preset value.

In Embodiment 1, the second preset value refers to a preset calibrating period, which represents a minimum time value required by calibrating time once.

Step 109 is obtaining, by the calibrating device, a benchmark time offset value and corresponding time of the same from a second storing place.

Obtained the benchmark time offset value in Embodiment 1 may include: recording the time offset value which is verified successfully; obtaining and recording a negative maximum offset value as a first benchmark time offset P1, obtaining and recording a negative minimum offset value as a second benchmark time offset P2, obtaining and recording a positive minimum offset value as a third benchmark time offset value P3 and obtaining and recording a positive maximum offset value as P4 by performing statistic for many times; recording respectively time corresponding to benchmark time offset values as a first time T1, a second time T2, a third time T3 and a fourth time T4.

Step 110 is determining, by the calibrating device, whether the current time offset value P is no less than the first benchmark time offset value P1 and no more than the second benchmark time offset value P2 or the current time offset value P is no less than the third benchmark time offset P3 and no more than the fourth time offset value P4; going to Step 112 if yes; otherwise, going to Step 111.

Step 111 is updating, by the calibrating device, the benchmark time offset value, returning successful verification information and going back to Step 101.

Figure 2:
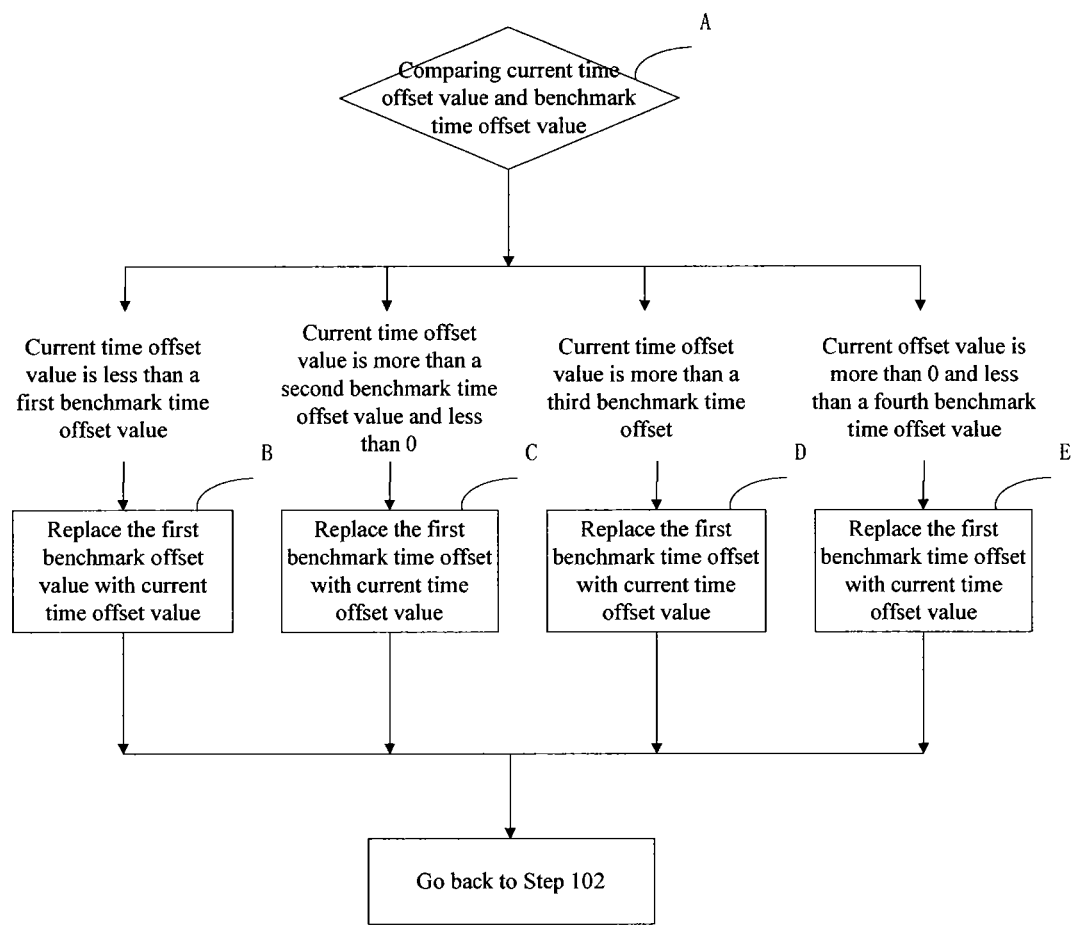
FIG. 2 is detailed flow chart of Step 111 of Embodiment 1 of the disclosure.

In Embodiment 1, as shown in FIG. 2, updating the benchmark offset value includes steps A to E.

Step A is comparing, by the calibrating device, current time offset value P with the benchmark time offset value.

Go to Step B if the current time offset value P is less than the first benchmark time offset value P1.

Step B is replacing the current time offset value P with a first benchmark time offset value P1.

Go to Step C if the current time offset value P is more than the second benchmark time offset value P2 and less than 0.

Step C is replacing the current time offset value P with the second benchmark offset value P2.

Go to Step D if the current time offset value P is more than 0 and less than the third benchmark time offset value P3.

Step D is replacing the current time offset value P with the third benchmark time offset value P3.

Go to Step E if the current time offset value P is more than the fourth benchmark time offset value P4.

Step E is replacing the current time offset value P with the fourth benchmark time offset value P4.

It should be noted that after step E is performed the step to be performed is going back to Step 101.

Step 112 is computing, by the calibrating device, benchmark offset according to the benchmark time offset value and corresponding time of the same.

The benchmark offset in Embodiment 1 includes a first benchmark offset and a second benchmark offset. Optionally, the first benchmark offset K1 may be obtained by dividing a difference between the first benchmark time offset value P1 and the fourth benchmark time offset value P4 by a difference between the first time T1 and the fourth time T4; the second benchmark offset K2 may be obtained by dividing a difference between the second benchmark time offset value P2 and the third benchmark time P3 by a difference between the second time T2 and the third time T3.

Step 113 is obtaining, by the calibrating device, a time offset of last successful verification P' and corresponding time T' of the same, computing a difference between the current time offset value P and the time offset value of last successful verification P' and recording the difference between P and P' as a first difference, computing a difference between the time of last successful verification T' and the time of current successful verification T and recording the difference between T and T' as the second difference, dividing the first difference by the second difference to obtain a unit offset K.

The calibrating device may obtain time offset value of last successful verification P' and corresponding time T' of the same from a third storing place.

Step 114 is determining whether the unit offset K is no more than the first benchmark offset K1 and no less than the second benchmark offset K2, going to Step 115 if yes; otherwise, returning successful verification information and ending the operation.

Step 115 is obtaining, by the calibrating device, a first product of a first calibrating value and the unit offset K and updating a clock offset according to the first product, storing current calibrating time to a first storing place, storing the current time offset value P and current successful verification time value T to a third storing place to replace the time offset value of last successful verification P' and corresponding time T' of the same, returning successful verification information and ending the operation.

Time calibration is implemented by setting four benchmark time offset values in Embodiment 1 of the disclosure; time calibration may also be realized by one benchmark time offset value as described in other embodiments of the disclosure. An optional process may be referred in Embodiment 2.

Embodiment 2

Figure 3:
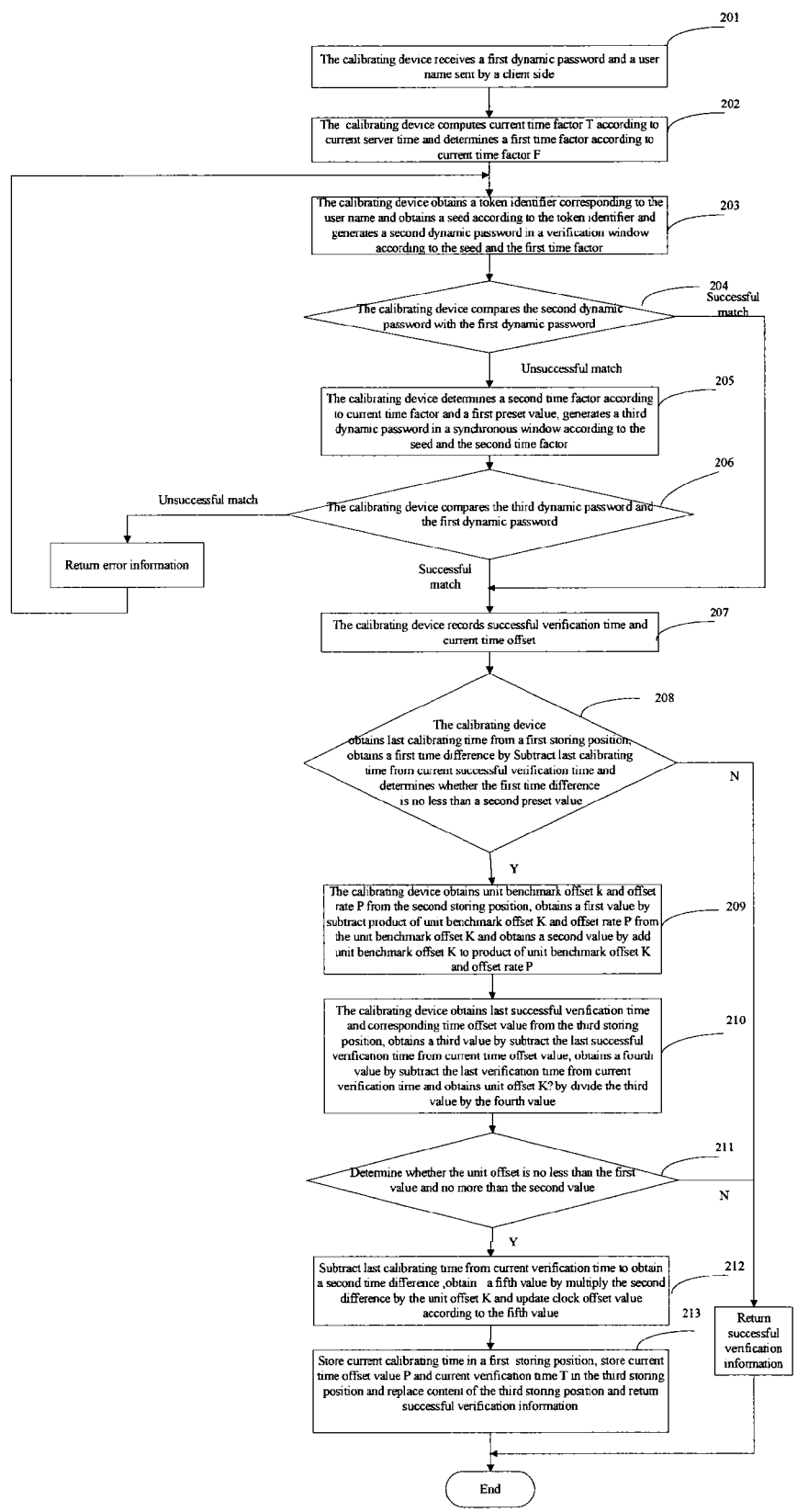
FIG. 3 is a flow chart of a method for verifying and calibrating time provided in Embodiment 2 of the disclosure.

Referring to FIG. 3, Embodiment 2 of the disclosure provides a method for calibrating time, which includes following steps 201-213.

Step 201 is receiving, by a calibrating device, a first dynamic password and a user name sent by a client.

Step 202 is computing, by the calibrating device, a current time factor F according to current time of a server and determining a first time factor according to the current time factor F.

In Embodiment 2, computing the current time factor F includes: subtracting a preset starting time T0 from a current server time T to obtain a difference and dividing the difference by a clock period; for example, the preset start time T0 is (2012-7-1-00:00:00), the current server time T is (2012-7-5-14:00:15) and the clock period is 60 seconds, the obtained current time factor F is 6605.

Where, the first time factor includes current time factor and a time factor of a previous clock period and a time factor of a next clock period; for example, the current time factor F is 6605, the current time factor includes 6604, 6605 and 6606.

Preferably, in Embodiment 2, the clock period is 60 seconds.

Step 203 is obtaining, by the calibrating device, a token identifier corresponding to the user name, obtaining the seed according to the token identifier and generating a second dynamic password group in a verification window according to the seed and the first time factor.

In Embodiment 2, the token identifier may be a token sequence number and the seed may be prestored in a device.

Step 204 is comparing a second dynamic password in the second dynamic password group with the first dynamic password, going to Step 207 if the second dynamic password matches with the first dynamic password; going to Step 205 if the second dynamic password does not match with the first dynamic password.

The first time factor in Embodiment 2 includes (F−1), F and (F+1).

Comparing, by the calibrating device, the second dynamic password in the second dynamic password group and the first dynamic password may include: obtaining, by the calibrating device, a time factor in the first time factor, generating a second dynamic password in the second dynamic password group according to current first time factor and the seed; determining, by the calibrating device, whether the current second dynamic password is identical to the first dynamic password, the current second dynamic password being determined to match with the first dynamic password if the current second dynamic password is identical to the first dynamic password; going back and the calibrating device obtaining a next time factor of the first time factor if the current second dynamic password is not identical to the first dynamic password.

It should be noted that comparing the second dynamic password in the second dynamic password group with the first dynamic password may also include: obtaining, by the calibrating device, all time factors of the first time factor, generating the second dynamic password group according to the first time factor and the seed; obtaining, by the calibrating device, a second dynamic password in the second dynamic password group and comparing the second dynamic password with the first dynamic password; the second dynamic password matches with the first dynamic password if the current second dynamic password is identical to the first dynamic password; going back and obtaining a second dynamic password again if the second dynamic password is not identical to the first dynamic password.

Step 205 is determining, by the calibrating device, a second time factor according to current time factor and a first preset value, generates a third dynamic password group in a synchronous window according to the seed and the second time factor.

The first preset value in Embodiment 2 is size of the synchronous window.

Preferably, the first preset value in Embodiment 2 is 10.

The second time factor in Embodiment 2 is a time factor inside the synchronous window and outside a verification window, which includes (F−2), (F−3), (F−4), (F−5), (F−6), (F+2), (F+3), (F+4), (F+5), and (F+6).

Step 206 is comparing, by the calibrating device, a third dynamic password in the third dynamic password group and the first dynamic password, going to Step 207 if the third dynamic password matches with the first dynamic password; prompting error information and going back to Step 202 if the third dynamic password does not match with the first dynamic password.

Comparing, by the calibrating device, the third dynamic password in the third dynamic password group with the first dynamic password may include: obtaining, by the calibrating device, a time factor of the second time factor, generating a third dynamic password in the third dynamic password group according to current second time factor and the seed; determining, by the calibrating device, whether the current third dynamic password is identical to the first dynamic password, the third dynamic password matches with the first dynamic password if yes; going back and obtaining a next time factor of the second time factor if no.

It should be noted that, comparing the third dynamic password in the third dynamic password group with the first dynamic password may also include: obtaining, by the calibrating device, all time factors of the second time factor, generating the third dynamic password group according to the second time factor and the seed; obtaining, by the calibrating device, a third dynamic password in the third dynamic password group and comparing the third dynamic password with the first dynamic password, the third dynamic password matches with the first dynamic password if third dynamic password is identical to the first dynamic password; going back to obtain a third dynamic password again if the third dynamic password is not identical to the first dynamic password.

Step 207 is recording, by the calibrating device, time of successful verification and current time offset value.

In Embodiment 2, the time offset value is referred to a time deviation between token internal clock and a verification server when a time factor is verified successfully except for the current time factor; for example, when a second dynamic password corresponding to the first time factor (F−1) is verified successfully with the first dynamic password, the current time offset value is recorded as −1.

Step 208 is obtaining, by the calibrating device, last calibrated time from a first storing place, subtracting the last calibrated time from current successful verification time to obtain a first time difference, determining whether the first time difference is no less than a second preset value, going to Step 209 if the first time difference is no less than the second preset value; otherwise, returning successful verification information and ending the present operation.

In Embodiment 2, the second preset value is referred to a preset calibrating period, which represents a minimum time value required by calibrating time once.

Step 209 is obtaining, by the calibrating device, a unit benchmark offset k and an offset rate P from a second storing place, subtracting a product of the unit benchmark offset K and the offset P from the unit bench offset K to obtain a first value; adding the unit benchmark offset K to the product of the unit benchmark offset K and the offset rate P to obtain a second value.

In Embodiment 2, the unit benchmark offset K represents a statistical value; the offset rate P is a permitted maximum offset value.

In Embodiment 2, the benchmark offset is obtained by doing statistic and computing on offset between time of token internal clock and a server of many times of successful verification and time corresponding to successful verification. The computing method includes, but is not limited to, average value method or variance method.

Step 210 is obtaining, by the calibrating device, time of last successful verification and corresponding time offset value from a third storing place, subtracting the last successful verification offset value from current time offset value to obtain a third value; subtracting time of last successful verification from current verification time to obtain a fourth value; dividing the third value by the fourth value to obtain unit offset K'.

Step 211 is determining whether the unit offset is no less than the first value and no more than the second value, going to Step 212 if the unit offset is no less than the first value and no more than the second value; returning successful verification information and ending the present operation if the unit offset is less than the first value or more than the second value.

Step 212 is subtracting the last calibration time from current verification time to obtain a second time difference, multiplying the second time difference by the unit offset K' to obtain a fifth value and updating a clock offset value according to the fifth value.

In Embodiment 2, updating the clock offset value includes step 213.

Step 213 is storing current calibrating time in the first storing place, storing current time offset value P and current successful verification time T in the third storing place to replace the content of the third storing place, returning successful verification information and end the present operation.

In Embodiment 2, unit offset can be calculated at first and then the first value and the second value are calculated. Step 209 to Step 210 can be replaced by Step 209' to Step 210'.

Step 209'' is obtaining, by the calibrating device, time of last successful verification and corresponding time offset value from the third storing place, subtracting time offset of last successful verification from current time offset value to obtain a third value, subtracting time of last verification from time of the current verification to obtain a fourth value, dividing the third value by the fourth value to obtain unit offset K'.

Step 210' is obtaining, by the calibrating device, the unit benchmark offset K and the offset rate P from the second storing place, subtracting a product of the unit benchmark offset K and the offset rate P to obtain the first value and adding the unit benchmark offset K to a product of the unit benchmark offset K and the offset rate P to obtain a second value.

In Embodiment 2, the unit benchmark offset K represents a statistical value; the offset rate P is a permitted maximum offset value.

In Embodiment 2, the benchmark offset is obtained by doing statistic and computing on offset between time of token internal clock and a server of many times of successful verification and time corresponding to successful verification. The computing method includes, but is not limited to, average value method or variance method.

The above are only the preferred embodiments of the disclosure and not used to limit the disclosure. For those skilled in the art, various modifications and changes can be made to the disclosure. Any modification, equivalent substitute and improvement within the spirit and principle of the disclosure are deemed to be included within the scope of the disclosure.

The invention claimed is:

1. A method for verifying and calibrating time, comprising the steps of:

a.) receiving, by a calibrating device, a first dynamic password and a user identifier sent from a client, computing a current time factor according to current time of a server and determining a first time factor;

b.) obtaining, by the calibrating device, a seed according to the user identifier, generating a second dynamic password group and comparing a second dynamic password in the second dynamic password group with the first dynamic password, performing step d.) if the second dynamic password matches with the first dynamic password, performing step c.) if the second dynamic password does not match with the first dynamic password;

c.) determining, by the calibrating device, a second time factor according to the current time factor and a first preset value, generating a third dynamic password group and comparing a third dynamic password in the third dynamic password group with the first dynamic password, performing step d.) if the third dynamic password matches with the first dynamic password; returning error information and performing step a.) if the third dynamic password does not match with the first dynamic password;

d.) recording, by the calibrating device, time of current successful verification and a current time offset value, obtaining last calibrating time, obtaining a first time difference according to time of current successful verification and the last calibrating time and determining whether the first time difference is no less than a second preset value, performing step e.) if the first time difference is no less than a second preset value; returning successful verification information if the first time difference is less than a second preset value;

e.) obtaining, by the calibrating device, a benchmark offset value and corresponding time of the benchmark offset value from a second storing place, determining whether the current time offset value belongs to an offset interval determined by the benchmark time offset value, performing step f.) if the current time offset value belongs to the offset interval determined by the benchmark time offset value; updating, by the calibrating device, the benchmark time offset value and returning successful verification information if the current time offset value does not belong to the offset interval determined by the benchmark time offset value;

f.) computing, by the calibrating device, a benchmark offset according to the benchmark time offset value and corresponding time of the same, obtaining a time offset value of last successful verification and corresponding time of the last successful verification, computing a unit offset according to the time offset of last successful verification and corresponding time of the same and a current time offset and corresponding time of the same, determining whether the unit offset belongs to the interval determined by the benchmark offset, performing step g.) if the unit offset belongs to the interval determined by the benchmark offset; returning successful verification information if the unit offset does not belong to the interval determined by the benchmark offset; and g.) updating, by the calibrating device, a clock offset according to the current time offset value, storing calibrating time of this time to a first storing place, storing current time offset value and the current successful verification time to a third storing place to replace an original content and returning successful verification information;

wherein the second preset value is a preset calibrating period, which represents a minimum time value required by calibrating time once.

2. The method according to claim 1, wherein the step of computing the current time factor according to the current time of the server and determining the first time factor comprises:

subtracting a preset starting time from the current time of the server to obtain a difference, adding the difference to the clock offset to obtain a sum, dividing the sum by a clock period to obtain the current time factor, wherein the first time factor comprises a current time factor and a time factor of a previous one clock period and a time factor of a next one clock period.

3. The method according to claim 1, wherein the step of generating the second dynamic password group comprises:

generating, by the calibrating device, the second dynamic password group according to the seed and the first time factor.

4. The method according to claim 1, wherein the step of comparing the second dynamic password in the second dynamic password group with the first dynamic password comprises:

obtaining, by the calibrating device, a time factor of the first time factor and taking the time factor as a current first time factor, generating the second dynamic password in the second dynamic password group according to the current first time factor and the seed;

determining, by the calibrating device, whether current second dynamic password is identical to the first dynamic password, the current second dynamic password being determined to match with the first dynamic password successfully if the current second dynamic password is identical to the first dynamic password; performing the step of obtaining, by the calibrating device, a time factor of the first time factor and taking the time factor as a current first time factor, generating the second dynamic password in the second dynamic password group according to the current first time factor and the seed and obtaining a next first time factor if the current second dynamic password is not identical to the first dynamic password;

or obtaining, by the calibrating device, all time factors of the first time factor and generating the second dynamic password group according to the first time factor and the seed;

obtaining, by the calibrating device, the second dynamic password from the second dynamic password group and comparing the second dynamic password with the first dynamic password, the second dynamic password being determined to match with the first dynamic password successfully if the second dynamic password is identical to the first dynamic password; performing the step of obtaining, by the calibrating device, the second dynamic password from the second dynamic password group and comparing the second dynamic password with the first dynamic password, the second dynamic password being determined to match with the first dynamic password successfully if the second dynamic password is identical to the first dynamic password to obtain a next second dynamic password from the second dynamic password group if the current second dynamic password is not identical to the first dynamic password.

5. The method according to claim 1, wherein the second time factor comprises all time factors inside a synchronous window and outside a verification window.

6. The method according to claim 1, wherein the step of generating the third dynamic password group comprises:

generating, by the calibrating device, the third dynamic password group according to the seed and the second time factor.

7. The method according to claim 1, wherein the step of comparing the third dynamic password in the third dynamic password group with the first dynamic password comprises:

obtaining, by the calibrating device, a time factor of the second time factor and taking the time factor as a current second time factor and generating the third dynamic password in the third dynamic password group according to the current second time factor and the seed;

determining, by the calibrating device, whether current third dynamic password is identical to the first dynamic password, the third dynamic password being determined to match with the first dynamic password successfully if the current third dynamic password is identical to the first dynamic password; performing the step of obtaining, by the calibrating device, a time factor of the second time factor and taking the time factor as a current second time factor and generating the third dynamic password in the third dynamic password group according to the current second time factor and the seed to obtain a next second time factor if the current third dynamic password is not identical to the first dynamic password;

or of obtaining, by the calibrating device, all second time factors and generating the third dynamic password group according to the second time factor and the seed;

obtaining, by the calibrating device, the third dynamic password in the third dynamic password group and comparing the third dynamic password with the first dynamic password, the third dynamic password being determined to match with the first dynamic password successfully if the current third dynamic password is identical to the first dynamic password; performing the step of obtaining, by the calibrating device, the third dynamic password in the third dynamic password group and comparing the third dynamic password with the first dynamic password, the third dynamic password being determined to match with the first dynamic password successfully if the current third dynamic password is identical to the first dynamic password to obtain a next second dynamic password from the third dynamic password group if the current third dynamic password is not identical to the first dynamic password.

8. The method according to claim 1, wherein the benchmark time offset value and corresponding time of the same comprise:

a first benchmark time offset value is a negative maximum offset value and corresponding time of the first benchmark time offset value is a first time; a second benchmark time offset value is a negative minimum offset value and corresponding time of the second benchmark time offset value is a second time; a third benchmark time offset value is a positive minimum offset value and corresponding time of the third benchmark time offset value is a third time; a fourth benchmark time offset value is a positive maximum offset value and corresponding time of the fourth benchmark time offset value is a fourth time.

9. The method according to claim 8, wherein the step of determining whether the current time offset value belongs to an offset interval determined by the benchmark offset value comprises:

determining, by the calibrating device, whether the current time offset value is no less than the first benchmark time offset value and no more than the second benchmark time offset value or the current time offset value is no less than the third benchmark time offset value and no more than the fourth benchmark offset value.

10. The method according to claim 1, wherein the step of updating, by the calibrating device, the benchmark time offset value comprises:

comparing, by the calibrating device, the current time offset value with the benchmark time offset value;

in the case where the current time offset value is less than the first benchmark offset value, replacing the current time offset value with the first benchmark time offset value;

in the case where the current time offset value is more than the second benchmark time and less than 0, replacing the current time offset value with the second benchmark time offset value;

in the case where the current time offset value is more than 0 and less than the third benchmark time offset value, replacing the current time offset value with the third benchmark time offset value;

in the case where the current time offset value is more than the fourth benchmark time offset value, replacing the fourth benchmark time offset value with the current time offset value.

11. The method according to claim 1, wherein the step of computing the benchmark offset value according to the benchmark time offset value and corresponding time of the benchmark time offset value comprises:

obtaining, by the calibrating device, a first benchmark offset by dividing a difference between the first benchmark time offset value and the fourth benchmark time offset value by a difference between the first time and the fourth time; obtaining, by the calibrating device, a second benchmark offset by dividing a difference between the second benchmark time offset value and the third benchmark time offset value by a difference between the second time and the third time.

12. The method according to claim 1, wherein the step of computing the unit offset value according to the time offset of last successful verification and corresponding time of the last successful verification and a current time offset value and corresponding time of the current time offset value comprises:

subtracting, by the calibrating device, the time offset value of last successful verification from the current time offset value to obtain a first difference, subtracting the time of last successful verification from current successful verification time to obtain a second difference, dividing the first difference by the second difference to obtain the unit offset.

13. The method according to claim 1, wherein the step of determining whether the unit offset belongs to the interval determined by the benchmark offset comprises:

comparing, by the calibrating device, the first benchmark offset with the second benchmark offset;

determining whether the unit offset is no more than the first benchmark offset and is no less than the second benchmark offset if the first benchmark offset is more than the second benchmark offset, performing step 17 if the unit offset is no more than the first benchmark offset and is no less than the second benchmark offset; ending the present operation if the unit offset is more than the first benchmark offset or is less than the second benchmark offset;

determining whether the unit offset is no more than the second benchmark offset and is no less than the first benchmark offset if the first benchmark offset is less than the second benchmark offset, performing step 17 if the unit offset is no more than the second benchmark offset and is no less than the first benchmark offset; ending the present operation if the unit offset is more than the second benchmark offset or is less than the first benchmark offset.

14. A method for verifying and calibrating time, comprising the steps of:

a.) receiving, by a calibrating device, a first dynamic password and a user identifier sent from a client, computing a current time factor according to current time of a server and determining a first time factor;

b.) obtaining, by the calibrating device, a seed corresponding to the user identifier, generating a second dynamic password group, and comparing a second dynamic password in the second dynamic password group with the first dynamic password, performing step d.) if the second dynamic password matches with the first dynamic password; performing step c.) if the second dynamic password does not match with the first dynamic password;

c.) determining, by the calibrating device, a second time factor according to the current time factor and a first preset value, generating a third dynamic password group and comparing a third dynamic password in the third dynamic password group with the first dynamic password, performing step d.) if the third dynamic password matches with the first dynamic password; performing step a.) if the third dynamic password does not match with the first dynamic password;

d.) recording, by the calibrating device, current successful verification time and a current time offset value, obtaining last calibrating time, obtaining a first time difference according to the current successful verification time and last calibrating time, determining whether the first time difference is no less than a second preset value, performing step e.) if the first time difference is no less than the second preset value; returning successful verification information if the first time difference is less than the second preset value;

e.) obtaining, by the calibrating device, a unit benchmark offset and an offset rate from a second storing place, computing a unit offset according to an offset value of last successful verification and corresponding time of the same and the current time offset value and corresponding time of the same; and f.) determining whether the unit offset belongs to an interval determined by a benchmark offset and the offset rate, updating a clock offset according to a current time offset value if the unit offset belongs to the interval determined by the benchmark offset and the offset rate, storing current calibrating time to a first storing place to replace a content of the first storing place, storing the current time offset value and the current successful verification time to a third storing place to replace an original content of the third storing place, returning successful verification information; returning successful verification information if the unit offset does not belong to the interval determined by the benchmark offset and the offset rate;

wherein the second preset value comprises:

a preset calibrating period which represents a minimum time value required by calibrating time once.

15. The method according to claim 14, wherein the step of computing a current time factor according to current time of a server and determining a first time factor comprises:

subtracting a preset starting time from the current time of the server to obtain a difference, adding the difference to the clock offset to obtain a sum and dividing the sum by a clock period.

16. The method according to claim 14, wherein the step of generating a second dynamic password group comprises generating, by the calibrating device, the second dynamic password group according to the seed and the first time factor.

17. The method according to claim 14, wherein the step of comparing a second dynamic password in the second dynamic password group with the first dynamic password comprises:

obtaining, by the calibrating device, a time factor of the first time factor and taking the time factor as a current first time factor, generating the second dynamic password in the second dynamic password group according to the current first time factor and the seed;

of determining, by the calibrating device, whether the current second dynamic password is identical to the first dynamic password; the second dynamic password being determined to match with the first dynamic password if the current second dynamic password is identical to the first dynamic password; performing the step of obtaining, by the calibrating device, a time factor of the first time factor and taking the time factor as a current first time factor, generating the second dynamic password in the second dynamic password group according to the current first time factor and the seed and obtaining a next first time factor if the current second dynamic password is not identical to the first dynamic password;

or obtaining, by the calibrating device, all time factors of the first time factor and generating the second dynamic password group according to the first time factor and the seed;

obtaining, by the calibrating device, the second dynamic password from the second dynamic password group and comparing the second dynamic password with the first dynamic password, the second dynamic password being determined to match with the first dynamic password successfully if the current second dynamic password is identical to the first dynamic password; performing the step of obtaining, by the calibrating device, the second dynamic password from the second dynamic password group and comparing the second dynamic password with the first dynamic password, the second dynamic password being determined to match with the first dynamic password successfully if the current second dynamic password is identical to the first dynamic password to obtain a next second dynamic password from the second dynamic password group if the current second dynamic password is not identical to the first dynamic password.

18. The method according to claim 14, wherein the second time factor comprises all time factors inside a synchronous window and outside a verification window.

19. The method according to claim 14, wherein the step of generating a third dynamic password group comprises generating, by the calibrating device, the third dynamic password group according to the seed and the second time factor.

20. The method according to claim 14, wherein the step of comparing a third dynamic password with the first dynamic password comprises:

obtaining, by the calibrating device, a time factor of the second time factor, generating a third dynamic password according to the current second time factor and the seed;

determining, by the calibrating device, whether the third dynamic password is identical to the first dynamic password, the third dynamic password being determined to match with the first dynamic password successfully if the third dynamic password is identical to the first dynamic password; performing the step of determining, by the calibrating device, whether the third dynamic password is identical to the first dynamic password, the third dynamic password being determined to match with the first dynamic password successfully if the third dynamic password is identical to the first dynamic password and obtaining next second time factor if the third dynamic password is not identical to the first dynamic password;

or obtaining, by the calibrating device, all time factors of the second time factor and generating all third dynamic passwords according to the second time factors and the seed;

comparing, by the calibrating device, the third dynamic passwords with the first dynamic password respectively, the third dynamic password being determined to match with the first dynamic password successfully if one of the third dynamic passwords is identical to the first dynamic password; obtaining a next third dynamic password and performing the step of comparing, by the calibrating device, the third dynamic passwords with the first dynamic password respectively, the third dynamic password being determined to match with the first dynamic password successfully if one of the third dynamic passwords is identical to the first dynamic password if one of the third dynamic passwords is not identical to the first dynamic password.

21. The method according to claim 14, wherein the step of computing an unit offset according to an offset value of last successful verification and corresponding time of the last successful verification and the current time offset value and corresponding time of the current time offset value comprises:
subtracting the time offset of last successful verification from the current time offset to obtain a third data, subtracting last verification time from the current verification time to obtain a fourth data and dividing the third data by the fourth data to obtain the unit offset.

22. The method according to claim 14, wherein a first interval determined by the benchmark offset and the benchmark offset rate comprises:
subtracting, by the calibrating device, a product of the benchmark offset and the benchmark offset rate from the benchmark offset to obtain a first data, adding the benchmark offset to the product of the benchmark offset and the benchmark offset rate to obtain a second data and determining that data which is greater than or equal to the first data and less than or equal to the second data belongs to the first interval;
wherein the step of determining whether the unit offset belongs to the interval determined by the benchmark offset and the benchmark offset rate comprises:
determining whether the unit offset is no less than the first data and no more than the second data.

* * * * *